April 8, 1952 H. C. ARENTZEN 2,591,996

MOVING-COIL PHONOGRAPH PICKUP

Filed Feb. 10, 1950

INVENTOR

Holger C. Arentzen

BY Young, Emery & Thompson

ATTORNEYS

Patented Apr. 8, 1952

2,591,996

UNITED STATES PATENT OFFICE 2,591,996

MOVING-COIL PHONOGRAPH PICKUP

Holger Christian Arentzen, Copenhagen, Denmark, assignor to Fonofilm Industri A/S, Copenhagen, Denmark, a joint-stock company of Denmark Application February 10, 1950, Serial No. 143,409
In Denmark January 14, 1949

5 Claims. (Cl. 179—100.41)

Figure 2:
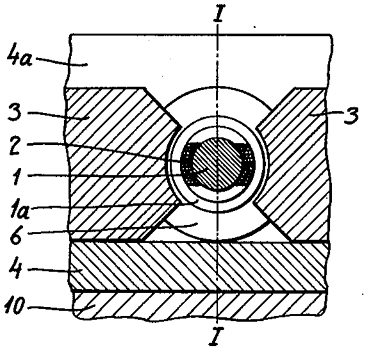

This invention relates to phonograph pick-up devices for use in phonographs of the type employing sound records having a laterally cut groove, and more particularly to pick-up devices of the type serving to translate mechanical oscillations imparted thereto by the record into electrical oscillations. A great variety of such pick-up devices are known including electromagnetic, electrodynamic and piezo-electric ones, but in all cases difficulty has been encountered in obtaining a sufficiently accurate, i. e. distortionless translation of the mechanical oscillations into electrical ones.

The main sources of distortion ordinarily met with in such pick-up devices may be grouped as follows:

(*a*) Frequency distortion, i. e. non-uniform reproduction of different frequencies. This type of distortion results mainly from insufficiently damped resonances of the stylus and associated movable parts within the audible range and is particularly difficult to eliminate where it is desired to extend the range of reproduction towards the highest frequencies perceptible to the human ear, such as is desirable with a view to the quality of the sound reproduced.

(*b*) Non-linear distortion resulting from lack of proportionality between input mechanical and output electrical oscillation amplitudes. This type of distortion becomes particularly embarrassing on account of the inevitable eccentricity of the sound tracks of records whereby the zero of the stylus is periodically displaced a distance that may be several times the useful amplitude.

(*c*) The so-called pinching effect resulting from vertical movement of the stylus owing to varying width of the groove.

(*d*) Mechanical oscillations of the stationary system or supporting structure of the pick-up device imparted thereto through the intermediary of the stylus and associated movable system.

In most of the known pick-up devices the quality of reproduction is considerably impaired by distortion resulting from one or more of the above-mentioned sources while in other cases complicated and expensive measures such as the introduction of an additional translating step have been resorted to in order to improve the reproduction.

It is an object of the present invention to devise a simple and relatively inexpensive phonograph pick-up device of the character referred to in which distortion resulting from all of the above mentioned and possible other sources can be suitably controlled or reduced to a minimum.

Another object of the invention is to construct a pick-up device with a movable system which has an extremely small directive force and is of extremely low weight so as to enable the system to follow oscillations of both the lowest and highest frequencies with the lowest possible pressure between the stylus point and the side walls of the groove and consequently with a minimum amount of wear.

A further object of the invention is to construct a pick-up device of the electrodynamic type which is relatively cheap in manufacture and reliable in operation and offers a reproduction of high quality.

With these and other objects in view, that will appear as the description proceeds, the invention consists in the novel arrangements and combinations of parts which now will be described in detail with reference to one specific embodiment of the invention illustrated in the accompanying drawing and will then be set forth in their general aspect in the appended claims.

Figure 3:
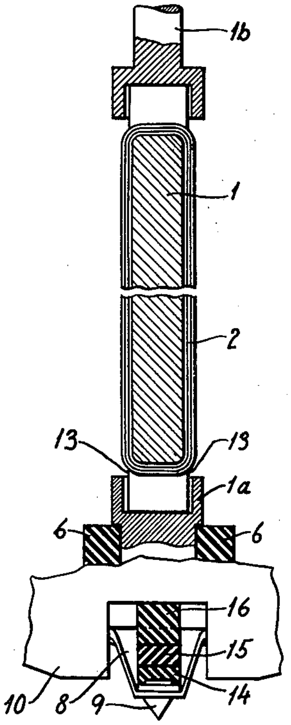
Figure 1:
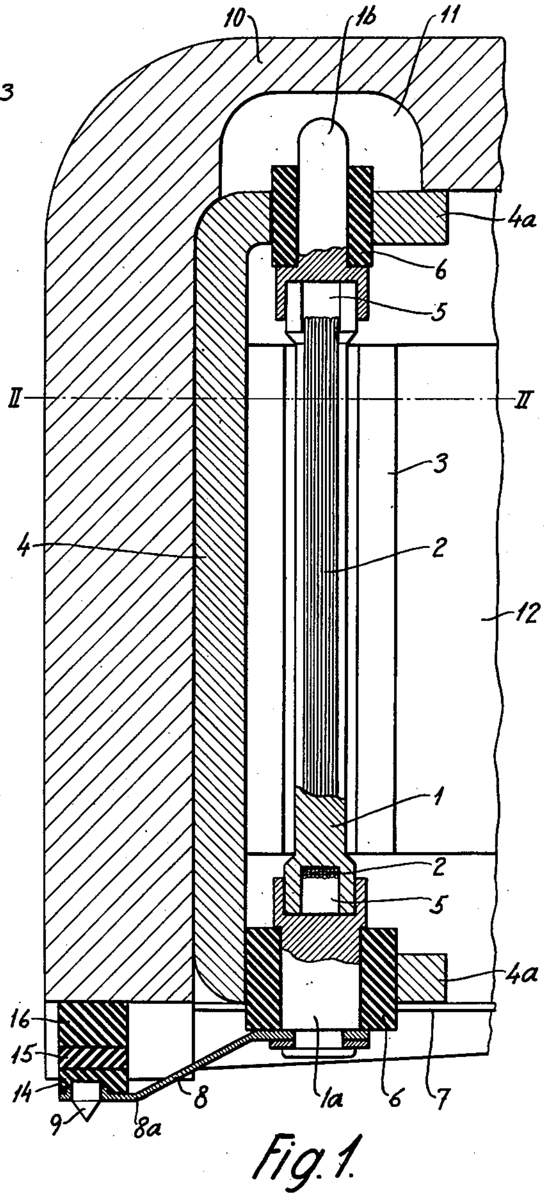

In the drawing:

Fig. 1 is a fractional sectional elevation of a phonograph pick-up device embodying the invention, taken along the line I—I of Fig. 2, Fig. 2 is a section along the line II—II of Fig. 1, and Fig. 3 is a front view, partly in section, of one form of the movable system of a pick-up device according to the invention.

In the drawing, 1 is an elongated core member provided at its ends with diametrically disposed notches or slots 5 serving to receive and support a winding or coil 2, wound on the core in such a manner that the turns thereof extend predominantly in the longitudinal direction of the core member along opposite sides of its circumferential surface while the shorter transverse runs of the turns are received in the notches 5. The supply conductors to the winding or coil 2 are indicated at 13 in Fig. 3. 1*a* and 1*b* are extension members recessed to receive the slotted ends of the core member to form therewith an integral structure serving as the armature of the pick-up device. It will be seen that this construction solves in a very simple manner the problem of producing an armature having a winding disposed substantially longitudinally thereof while at the same time presenting smooth end portions suitable for rotatably supporting the armature.

To this end the extension members 1*a* and 1*b* are engaged in sleeves 6 of an elastic and damping material inserted in holes provided in horizontal legs 4a of a U-shaped holder 4 of non-magnetic material forming part of the stationary system or supporting structure of the pick-up device. This system or structure further comprises a permanent magnet 12 having pole pieces 3 defining between them an elongated space through which the armature extends in the longitudinal direction. At its bottom the pick-up device is closed by means of a cover 7 fixed to the lower horizontal leg 4a of the holder which is again secured to an outer casing 10 provided at its top with a recess serving to accommodate the protruding end of the upper extension member 1b.

While the core member has been shown in the drawing as being provided with special extension members for rotatably supporting the core in the magnetic field, it has been found that such extension members are not absolutely necessary and that the protruding parts of the slotted ends may be inserted directly into the above mentioned elastic and damping material. In cases where it is desired to reduce the directive force resulting from the engagement of the ends of the core member with the elastic material to a minimum, only one end, and preferably the lower one, is in fixed engagement with the elastic material, whereas the other end is allowed to turn freely or with the smallest possible amount of friction in the sleeve.

The lower extension member 1a carries at its lower end a transversely extending arm 8 which again carries a stylus 9 ordinarily in the form of a sapphire or the like. As will be seen, the arm 8 is of flat cross-sectional shape with its largest dimension in a horizontal direction, and comprises a main body portion inclined relative to the axis of the armature, and a stylus carrying end portion bent relative to the main body portion along a transverse bending line 8a in such a manner that the tip of the stylus is situated substantially in the extended longitudinal axis of the main portion. It is essential that the material used for this arm has a high elasticity coefficient and a low specific gravity so as to reduce its inertia to a minimum without unduly reducing its strength.

An analysis will show that a pick-up device built up as described and illustrated may be constructed to render a very high degree of perfection in the transduction of oscillations recorded in a laterally cut groove. First, it will be seen that by employing a narrow elongated coil rotatably mounted between a pair of magnetic poles a large angular movement of the coil is possible without introducing a non-linear relation between the angular movement and the voltage induced in the coil. This is particularly important because many discs show a considerable eccentricity which results in a variation of the zero position of the movable system. Second, on account of the large range of strict linear relation between angular movement of the coil and the voltage induced therein, due to the constant magnetic field surrounding the coil, it is possible to reduce the directive force acting on the coil through the engagement of the ends of the core member with the bearings of elastic material, to a very small value. In fact the directive force need only be sufficiently large to fix the zero position of the coil so that it will not vary through accidental touch. On account of this low directive force the armature may follow the oscillations of low frequencies which often have large amplitudes with a very low pressure of the stylus against the side walls of the groove.

Third, the construction provides a very small moment of inertia in respect of the axis of rotation, partly by concentrating the comparatively heavy parts close to the axis and partly by reducing the contribution made by the stylus carrying arm to a minimum. This latter feature is specially important because at very high frequencies there is a tendency of the whole system to oscillate about the common axis of gravity (i. e. the vertical axis about which the moment of inertia has its smallest value) and this axis should therefore be as close as possible to the geometrical axis of the armature. It is well known that in an oscillating system a small mass of the system has the same significance at high frequencies as a small directive force at low frequencies, and it will easily be understood, therefore, that by reducing the mass the armature can be made to follow the oscillations of high frequencies without having resort to an increased stylus pressure.

Thus by reducing the directive force acting on the armature and by also reducing the moment of inertia in respect of the axis of rotation it is achieved that the stylus point is able to follow the recorded oscillations of both the lowest and highest frequencies with a minimum of pressure between the stylus point and the side walls of the groove and therefore with the smallest possible wear of the disc and the stylus.

As regards pinching effect, the arm 8, owing to its relatively high resiliency for vertical forces, has a sufficient compliance to substantially prevent the transfer of vertical movement of the stylus to the armature and supporting structure, while on the other hand being sufficiently rigid for horizontal forces to ensure an accurate transfer of horizontal movements of the stylus to the armature.

A further source of distortion may be introduced through torsion or twisting of the stylus carrying arm whereby an undesired frequency distortion may arise in the transmission of the oscillations from the stylus to the armature. Since, however, according to the invention, the tip of the stylus on which the horizontal forces are active, is preferably situated in the extended longitudinal axis of the main portion of the arm, it follows that such forces do not produce a twisting moment about the said axis so that the non-desired oscillatory twisting of the arm is reduced to a minimum.

In the embodiment shown, a mechanical filter is interposed between the stylus 9 and the supporting structure 10 of the pick-up device, such filter consisting of an elastically damping material such as artificial rubber in combination with a mass 15 interposed between two layers 14 and 16 of the said damping material. This filter causes an additional damping of non-desired oscillations of high frequencies resulting from resonance of the unit formed by the stylus 9 and the arm 8. The filter also contributes towards preventing twisting of the stylus carrying arm about its longitudinal axis.

While, as has been seen, the vertical compliance of the arm 8 substantially prevents the transfer of vertical oscillations to the supporting structure, a certain transfer of horizontal oscillations thereto is inevitable since the oscillating directive force acting on the armature reacts on the supporting structure. Of course, the sleeves 6 have a damping effect on these oscillations as well, but owing to the relatively great mass of the supporting structure this damping effect cannot be regarded as practically absorbing, and care should therefore be taken to keep the horizontal oscillations on a low and uniform level throughout the useful frequency range. This is a further reason why the directive force should be kept low and moreover, to prevent excessive amplitudes within the useful range it is proposed, according to the invention, to so select the size of the said directive force in relation to the moment of inertia of the supporting structure that the resonance frequency of the latter for horizontal forces acting on the stylus will be lower than the lowest frequency recorded on a record to be played, but higher than the frequency of rotation of such record, the latter precaution serving to prevent excessive displacement of the zero position of the armature resulting from eccentricity of the sound track.

I claim:

1. A phonograph pick-up device comprising a supporting structure, a pair of opposed magnetic pole pieces fast with said supporting structure and shaped to define an elongated space between the opposed faces thereof, an elongated armature extending longitudinally through said elongated space and mounted for rotation relative to said pole pieces, a winding carried by said armature and having its turns extending longitudinally along the circumferential surface thereof on both sides thereof, an arm extending transversely from said armature outside said space, said arm being relatively resilient for forces in the axial direction of said armature, but relatively rigid for forces perpendicular thereto, and a stylus carried by said arm at a distance from the axis of said armature and constructed for engagement with the groove of a record disposed in a plane substantially perpendicular to the axis of said armature.

2. A phonograph pick-up device as in claim 1 and in which said armature comprises an elongated core member provided with notches at the ends thereof for receiving and supporting the transverse runs of the turns of said winding.

3. A phonograph pick-up device as in claim 1, in which the armature comprises a core member having at its ends extension members each having a recess receiving the respective end of the core member, the extension members being rotatably mounted in the supporting structure.

4. A phonograph pick-up device as in claim 1 and further comprising resilient means associated with said supporting structure for exerting on said armature a resilient torque tending to keep the armature in a neutral position, said torque having a size so selected in relation to the moment of inertia of said supporting structure thereof for transverse forces acting on said stylus will be lower than the lowest frequency recorded on a record to be played, but higher than the frequency of rotation of such record.

5. A phonograph pick-up device as in claim 1 and in which said arm comprises a main portion inclined to the axis of said armature, and a stylus carrying end portion bent relatively to said main portion in such a manner as to dispose the tip of said stylus substantially in the extended longitudinal axis of said main portion.

HOLGER CHRISTIAN ARENTZEN.

REFERENCES CITED

The following references are of record in the file of this patent:

UNITED STATES PATENTS

| Number | Name | Date |
|---|---|---|
| 1,767,610 | O'Leary | June 24, 1930 |
| 1,817,787 | Vermuelen et al. | Aug. 4, 1931 |
| 2,181,265 | Dudley | Nov. 28, 1939 |
| 2,351,353 | McCarty | June 13, 1944 |
| 2,406,887 | McBride | Sept. 3, 1946 |
| 2,411,997 | Kelly | Dec. 3, 1946 |

FOREIGN PATENTS

| Number | Country | Date |
|---|---|---|
| 22,604 | Denmark | Nov. 19, 1917 |
| 322,813 | Great Britain | Dec. 16, 1929 |